US007191186B1

(12) United States Patent
Pullen

(10) Patent No.: US 7,191,186 B1
(45) Date of Patent: Mar. 13, 2007

(54) METHOD AND COMPUTER-READABLE MEDIUM FOR IMPORTING AND EXPORTING HIERARCHICALLY STRUCTURED DATA

(75) Inventor: Walter David Pullen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 10/306,022

(22) Filed: Nov. 27, 2002

(51) Int. Cl.
*G06F 17/00* (2006.01)

(52) U.S. Cl. ............... 707/102; 707/103 R; 707/104.1; 707/101

(58) Field of Classification Search ............... 707/4–8, 707/100–104.1, 202–204; 715/501.1
See application file for complete search history.

(56) References Cited

U.S. PATENT DOCUMENTS

| | | | | |
|---|---|---|---|---|
| 6,529,905 | B1 * | 3/2003 | Bray et al. ...................... | 707/8 |
| 6,549,916 | B1 * | 4/2003 | Sedlar ......................... | 707/200 |
| 6,819,339 | B1 * | 11/2004 | Dowling ...................... | 715/738 |
| 6,862,710 | B1 * | 3/2005 | Marchisio ................. | 715/501.1 |

OTHER PUBLICATIONS

Keisuke Nakano and Susumu, "Deriving Event-Based Document Transformers from Tree-Based Specifications," Elsevier Science B.V., 2001, pp. 1-25.

Josephine Cheng, Jane Xu, "XML and DB2," 16th International Conference on Data Engineering, Feb. 29-Mar. 3, 2000, pp. 569-573.
Martin Gudgin, "X marks the path," www.dnjonline.com/articles/essentials/iss25_essentials_xpath.asp, Nov. 20, 2002, pp. 1-6.
Rakesh Agrawal, Klaus Dittrich, and Anne H.H. Ngu, "Efficient Filtering of XML Documents with Xpath Expressions," Feb. 26-Mar. 1, 2002, 18th International Conference on data Engineering, pp. 235-244.
Joao Pereira et al., "A High-throughput XML-based Publish and Subscribe System," Sep. 11-14, 2001, Proceedings of the Twenty-seventh International Conference on Very Large Data Bases, pp. 723-724.
Oleg Kiselyov, "A Better XML Parser through Functional Programming," Jan. 19-20, 2002, Practical Aspects of Declarative Languages, pp. 209-224.

* cited by examiner

*Primary Examiner*—Sana Al-Hashemi
(74) *Attorney, Agent, or Firm*—Merchant & Gould

(57) ABSTRACT

A method and computer-readable medium are provided for selectively importing and exporting data in an electronic document. An import application program interface (API) may be implemented to import content from a hierarchically structured document, such an XML file. The import API works in conjunction with a parser to scan the document and extract content from selected elements, nodes, attributes, and text. The import API also utilizes a callback component for processing the extracted content. An export API may also be implemented to export data to create a hierarchically structured document, such as an XML file. The export API works in conjunction with a writer to receive data and export the data as elements, nodes, attributes, and text in the hierarchically structured document.

22 Claims, 4 Drawing Sheets

METHOD AND COMPUTER-READABLE MEDIUM FOR IMPORTING AND EXPORTING HIERARCHICALLY STRUCTURED DATA

FIELD OF THE INVENTION

The present invention relates to a method and computer-readable medium for importing and exporting hierarchically structured data.

BACKGROUND OF THE INVENTION

Computer software applications allow users to create documents containing data organized in a hierarchical structure such as spreadsheets, calendars, bank statements, product lists, outlines, etc. to exchange with other users over computer networks, such as the Internet. For example, users may create documents using Extensible Markup Language (XML) programs to exchange hierarchical data between computer systems that use different formats. XML documents have user-definable descriptive tags adjoining the data contained therein, making the data understandable by a wide variety of computers. The data may be imported from the document for viewing by the user by simply parsing the description-bearing tags. After viewing the data, the user may then export the data into a new or edited hierarchical formatted document to send to other users.

Parsing a document, however, is a slow and complicated process requiring a number of steps. Some current parsers, such as Simple API for XML (SAX), are event-based parsers in which XML tags are read sequentially, one at a time. However, the user is required to keep state and search through the entire file to find the desired XML tags. Other parsers, such as Document Object Model (DOM), are tree-based parsers which load an entire XML file into memory and which allow random access, thus making it easier to find desired XML tags than with event-based parsers. However, tree-based parsers require navigating through the "tree" to find the desired XML tags. Furthermore, such parsers require a significant amount of time and memory making them impractical for parsing large XML files.

Thus, there is currently no easy way to import data from a hierarchical structured document. That is, there is no easy way to selectively search the document for a specific tag or section containing data that may be of interest to a user, without having to search through the entire document with event-based parsers such as SAX or having to navigate through the tree while at the same time using significant time and memory resources with tree-based parsers such as DOM.

Similarly, while tree-based parsers such as DOM (which stores the entire file in memory), can export subtrees or other hierarchical data, such parsers are limited by the significant utilization of time and memory resources inherent in such parsers.

Therefore, there is a need in the art for a method and system for selectively importing and exporting content in hierarchical structured documents. It is with respect to these and other considerations that the present invention has been made.

SUMMARY OF THE INVENTION

The present invention provides a method and system for selectively importing and exporting data in an electronic document. In one embodiment, a method is provided for selectively importing content from an electronic document. An electronic document is received having data arranged in a hierarchical file structure. The hierarchical file structure may be XML. The data in the electronic document includes content associated with the data. The data may include XML elements, attributes, nodes, and text. Specific data from the document is specified to be imported and an action is performed on the specified data to import the associated content. The action may include parsing the document for the specified data and extracting items of content associated with the specified data.

In another embodiment of the invention, a method is provided for exporting data from a source in a computer system to create an electronic document. Specified data received from a source in the computer system is exported to create the electronic document. The created electronic document may have a hierarchical file structure such as XML. The created document may include XML elements, attributes, and nodes. The source may be a client or a server in the computer system. The data may be exported to a data stream, a memory buffer, or a file.

Embodiments of the present invention also provide computer-readable media for selectively importing and exporting data in an electronic document. Additional details regarding various aspects of the present invention will become apparent from the detailed description of the invention that follows.

DETAILED DESCRIPTION

The following description of an embodiment of the present invention is made with reference to the above-described drawings. The present invention is directed to a method and system for importing and exporting hierarchically structured data in an electronic document.

Operating Environment

Figure 1:
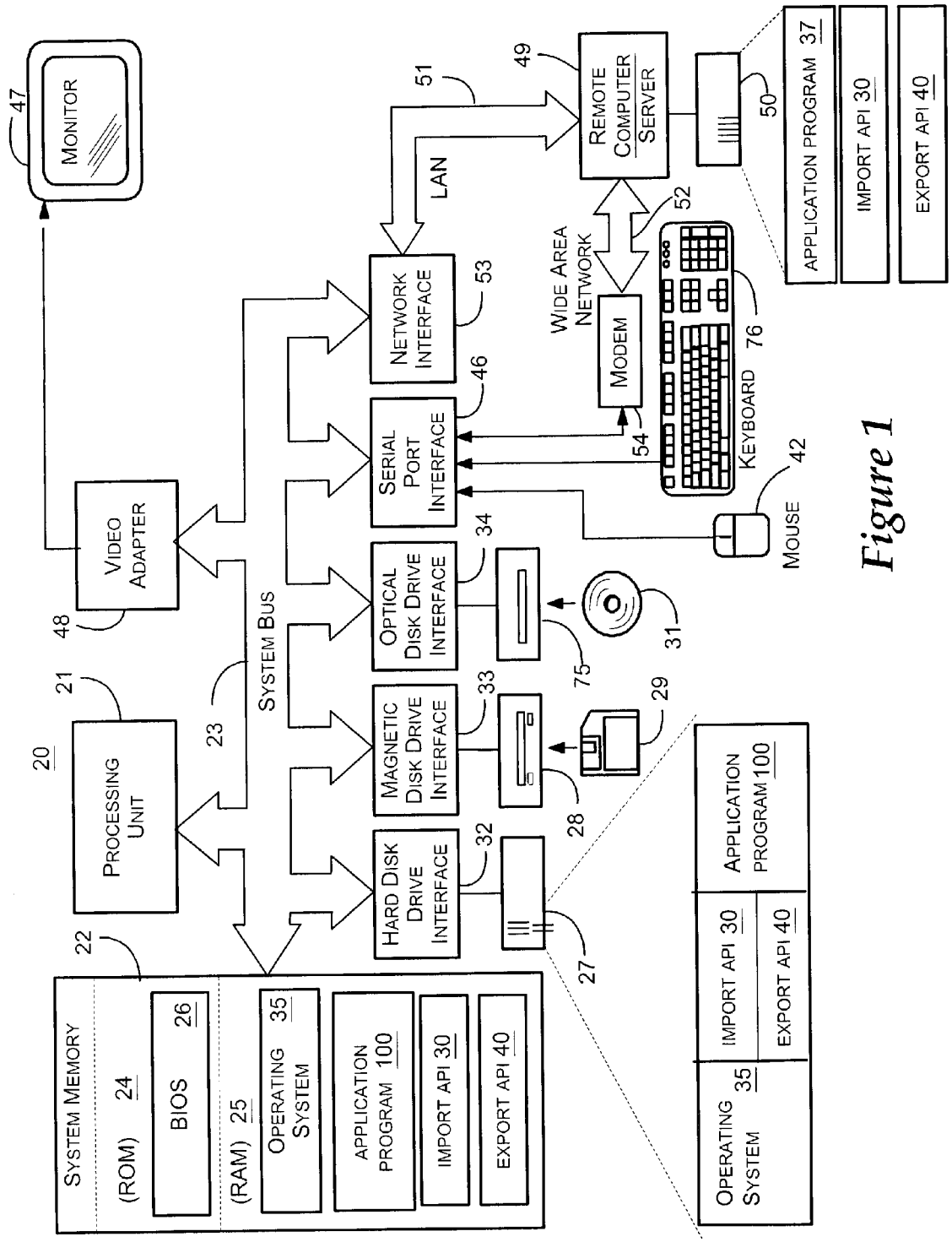
FIG. 1 is a block diagram of a computer and associated peripheral and networked devices that provide an illustrative operating environment for the present invention.

FIG. 1 and the following discussion are intended to provide a brief, general description of a suitable computing environment in which the invention may be implemented. While the invention will be described in the general context of an application program interface that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 75, e.g., for reading a CD-ROM disk 31 or to read from or write to other optical media. The hard disk drive 27, magnetic disk drive 28, and optical disk drive 75 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 37 such as a word processor program (or other type of program), import API 30, export API 40, and other program modules (not shown).

A user may enter commands and information into the personal computer 20 through a keyboard 76 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Operation

Figure 2:
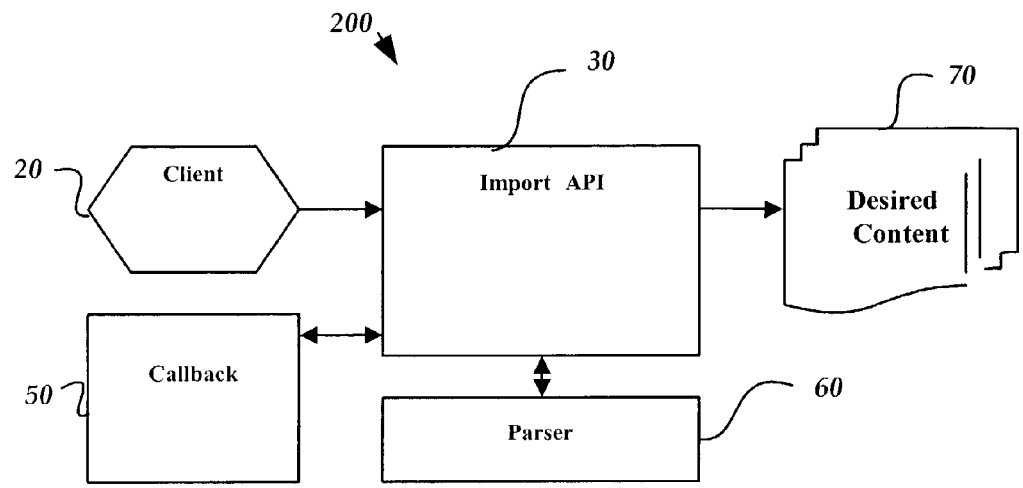
FIG. 2 is a block diagram showing an illustrative architecture for importing an electronic document according to an embodiment of the present invention.

FIG. 2 is a block diagram illustrating an illustrative software architecture 200 for use in conjunction with an embodiment of the present invention. The architecture includes the import application program interface (API) 30 for importing content from an electronic document having data arranged in a hierarchical file structure. In one embodiment, the electronic document is an XML document composed of tags, attributes, and nodes (subtrees) associated with various items of content. For purposes of example only and not for limitation of the invention described herein, the following is an illustrative XML file upon which the API 30 may be practiced:

```
<SOAP-ENV:Envelope xmlns:SOAP-
ENV="http://schemas.xmlsoap.org/soap/envelope/">
    <SOAP-ENV:Body>
        <CancelResponse xmlns="http://schemas.microsoft.com/billing">
            <Services>
                <Service Name="Some service"/>
                <!--More Services here-->
            </Services>
            <Subscriptions>
                <Subscription ID="Subscription ID">
                    <BalanceImpacts>
                        <BalanceImpact ImpactType="Type of impact">
                            <Amount>Non-zero amount of impact</Amount>
                        </BalanceImpact>
                        <!--More Balance Impacts here-->
                    </BalanceImpacts>
                </Subscription>
                <!--More Subscriptions here-->
            </Subscriptions>
            <Currency>Account Currency type</Currency>
            <Amount>Total balance impact</Amount>
        </CancelResponse>
    </SOAP-ENV:Body>
</SOAP-ENV:Envelope>
```

As shown in FIG. 2, the import API 30 receives the electronic document from the client computer 20 described above in FIG. 1. In an alternative embodiment, the electronic document may also be received from a server such as the remote computer server 49. The import API 30 is in communication with a parser 60 for parsing the electronic document for data (i.e., elements, attributes, nodes, and text) defining the hierarchical structure of the electronic document and associated content. The import API 30 manages the parser 60 for specifying specific data to be parsed from the document. In one embodiment, the parser 60 may be an event-based parser such as the OFFICE XML PARSER from MICROSOFT CORPORATION of Redmond, Wash. The parser 60 may also be a tree-based parser such as a document object model (DOM) parser. The API 30 is advantageous over using event-based and tree-based parsers directly because a user is allowed to specify the specific data he wants extracted from the document. As is known to those skilled in the art, event-based parsers scan documents one line at a time and provides one item of data (such as a tag) at a time sequentially, requiring a user to keep state to find desired data. Tree-based parsers load entire documents into memory, but a user is still required to navigate through the loaded document to find desired data. The aforementioned advantages will be described in more detail below with respect FIG. 4.

The import API 30 is also in communication with callback component 50. Callback component 50 communicates with the import API 30 to determine additional items of content to be imported from the electronic document after the first data has been extracted. For example, if an element or node in the electronic document is associated with more than one item of content (such as a list of names), the import API 30 will extract the first name and then access the callback component 50 to extract the next name until all of the names in the list have been extracted. In other words for a list of items, the import API 30 can pass each item of the list to the callback component 50 in sequence, where the client 20 of the API 30 can then do what it wants with the item. The client 20 can also use the callback component 50 to communicate back to the API 30 during the import process, to change how to process the rest of the data. In various embodiments, the content 70 imported by the API 30 may be a data stream, a memory buffer, or a file.

Figure 3:
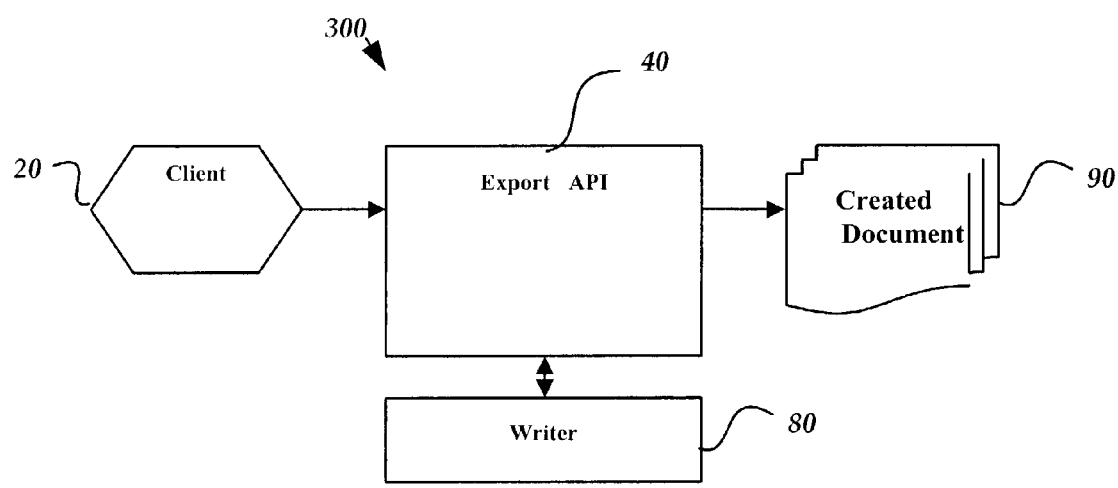
FIG. 3 is a block diagram showing an illustrative architecture for exporting data to create an electronic document according to an embodiment of the present invention.

Referring now to FIG. 3, a block diagram is shown illustrating an illustrative software architecture 300 for use in conjunction with an embodiment of the present invention. The architecture includes the export application program interface (API) 40 for exporting data from a source to create an electronic document 90. In one embodiment the created document 90 has a hierarchical file structure, such as an XML document. As shown in FIG. 3, the export API 40 receives data from the client computer 20. In another embodiment, the data may be received from a server such as the remote computer server 49. The data to be exported may include text strings or a fixed list of variables among other types of data.

The export API 40 is in communication with a writer 80 for receiving data specified by the export API 40 to be exported and using the data to write elements, nodes, attributes, or text in the created electronic document 90. The export API 40 manages the writer 80 for specifying specific data to be exported. In one embodiment, the writer 80 may be an XML Exporter component such as the OFFICE XML EXPORTER from MICROSOFT CORPORATION of Redmond, Wash. The export API 40 allows writing multiple pieces of data (such as XML content) or an entire file in a single API call. This is more advantageous than accessing the writer 80 directly, since the writer 80 only allows writing one piece of data at a time. It should be understood that the syntax for implementing the export API 40 may be very similar to the import API 30. Thus, in an embodiment of the invention, a user may use the export API 40 and the import API 30 to write and later read the user's own data, although the user is not required to use both. The aforementioned advantages of the export API 40 will be described below with respect of FIG. 5.

Figure 4:
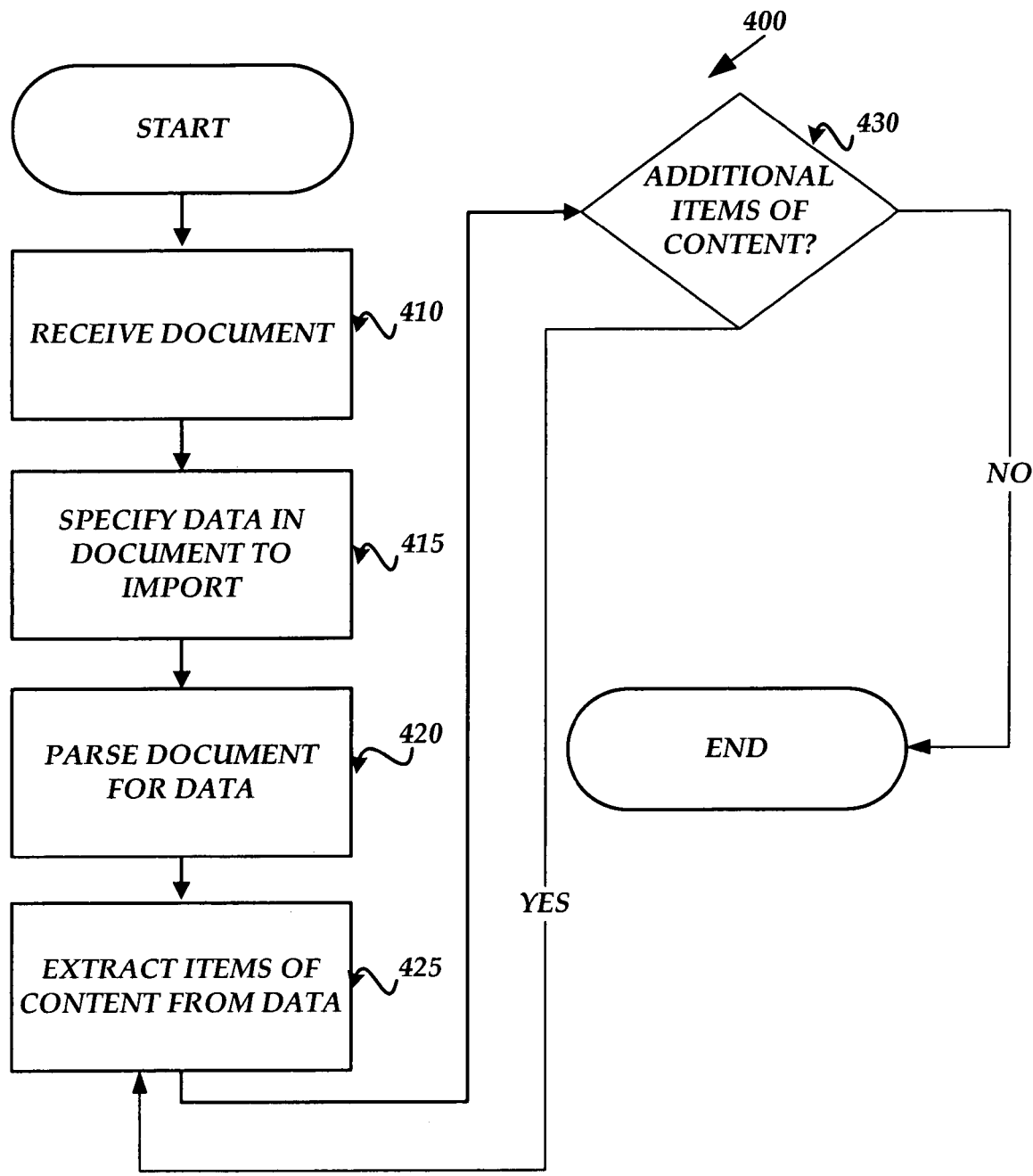
FIG. 4 is a flow chart showing steps performed by an illustrative routine of importing an electronic document according to an embodiment of the present invention.

FIG. 4 is a flow chart showing an illustrative routine 400 for selectively importing content from an electronic document, such as an XML document, in a computer system according to an embodiment of the invention. For purposes of description, FIG. 4 is described with reference to FIGS. 1 and 2.

The routine 400 begins at block 410 where the import API 30 receives an electronic document from the personal computer 20 or the remote computer server 49. At block 415, the import API 30 specifies data in the document to be imported. A user may specify specific data to be imported in the application program 100 (which may be a word processor) which in turn communicates this information to the import API 30. For example, in the illustrative XML document listed above, the user may be interested in the <Service> element content, the <Subscription> node content, the <Currency> element content (e.g., Account Currency type), and the <Amount> element content (e.g., Total balance impact), but not be concerned about the <SOAP-ENV> elements and attributes which do not convey any useful information to the user. By selecting specific nodes and elements, the user also selects all of the elements contained within. For example, the <Subscription> node contains a <BalanceImpacts> node where <BalanceImpact> is an arbitrary length list of elements. The <Services> element also contains an arbitrary list of Service Names.

The routine 400 continues at block 420 where the parser 60 searches the electronic document for the data (i.e., nodes and elements) specified by the import API 30. At block 425, the import API 30 extracts the content from the data in the parsed document. As briefly described above, in one embodiment the parser 60 is an event-based parser in which each element in the document is scanned and the content contained therein is extracted by the import API 30. For example, the parser 60 scans the document for the <Services> element previously specified by the user and the import API 30 extracts the text string "Some service" from the "Name" attribute of the <Service> element. In a similar fashion all of the elements are scanned until all of the content associated with the specified elements has been extracted from the document.

The routine 400 continues at block 430, where the import API 30 determines if there are additional items of content contained in an element specified to be imported. If there are no additional items of content the routine 400 then ends. The client 20 may then choose to create a new document with the extracted content (e.g., using the export API 40). Conversely, if there are additional items of content contained in an element specified to be imported, the routine returns to block 425 where the API 30 extracts the next additional item of content. For example, after the import API 30 extracts the "Some service" string from the "Name" attribute of the <Service> element, the API 30 determines if there are any additional <Service> elements containing "Name" attributes, extracts the content from each one, and passes it to the callback component 50 for printing out the desired string.

The routine illustrated in FIG. 4 for using the API 30 may be implemented in computer code processing XML data as shown in the illustrative code samples below.

Illustrative Use of Import API:

MsoFImportXML(pistm, FMyCallback( ), NULL, "o CancelResponse;o Services;(*o

Service;a0 Name;c;p1;)c;o Subscriptions;(*o Subscription; a1 ID;o

BalanceImpacts;p2;(*o BalanceImpact;a2 ImpactType;e3 Amount;c;p3;)c;c;)c;e4

Currency;e5 Amount;p4;f;", NULL, msoffixSOAP);

In the illustrative use of the import API 30 shown above, the client 20 passes in an action string which specifies the content desired (e.g., one or more "Name" attributes of the <Service> element). An action string is a sequence of individual actions which indicate content to search for or content expected at a particular point. In the example above, the "o CancelResponse" action means to go to the next open element of <CancelResponse> in the XML document, the "a1 ID" action means to copy the "ID" attribute of the current element into entry #1 of a set of extracted strings the client can look at in their callback or after the import API finishes, the "p2" action means to call the second case of the callback, and so on. An action string may also contain action groups, which are ways of marking a sequence of actions to be handled in a certain manner. In the example above, the action groups are indicated by the relevant actions being surrounded with parentheses, where the action groups marked with an asterisk mean the set of actions indicated may be repeated zero or more times, forming a list. Another example of an action group (not shown in the illustrative use above) indicates a set of actions or pieces of content expected to appear at the given point in the XML document.

Illustrative Callback Function:

```
BOOL FMyCallback(void *pvClient, MSOHISD *phisd,
MSOXPS *rgxps, int iState)
{
  switch (iState) {
  case 1: // Processing the <Services> list
  printf("<Service> Name attribute=%s\n", rgxps[0].wz);
  break;
  case 2: // Processing the <Subscriptions> outer list
  printf("<Subscription> ID attribute=%s\n", rgxps[1].wz);
  break;
  case 3: // Processing the <BalanceImpacts> inner nested list
  printf("<BalanceImpact> ImpactType attribute=%s\n",
    rgxps[2].wz);
  printf("<Amount> element text=%s\n", rgxps[3].wz);
  break;
  case 4: // Processing final items after the lists above
  printf("Final <Currency> element text=%s\n", rgxps[4]
    .wz);
  printf("Final <Amount> element text=%s\n", rgxps[5]
    .wz);
  break;
  }
  return TRUE;
}
```

It should be understood that the import API 30 may also be used without the client 20 having to specify a callback function such as when the document doesn't contain any lists or repeated elements. For example, if the XML file contained only one <Service> element, one <BalanceImpact> node, and one <Subscription> node, the import API 30 could import the file in one line of code as shown below:

WCHAR wzServiceName[255], wzSubscriptionID[10], wzBalanceImpactImpactType[255], wzBalanceImpactAmount[20], wzCurrency[20], wzTotalAmount[20];

MSOXPS rgxps[6];

MsoInitXpsBuffer(&rgxps[0], wzServiceName, 255);

MsoInitXpsBuffer(&rgxps[1], wzSubscriptionID, 10);

MsoInitXpsBuffer(&rgxps[2], wzBalanceImpactImpactType, 255);

MsoInitXpsBuffer(&rgxps[3], wzBalanceImpactAmount, 20);

MsoInitXpsBuffer(&rgxps[4], wzCurrency, 20);

MsoInitXpsBuffer(&rgxps[5], wzTotalAmount, 20);

MsoFImportXML(pistm, NULL, NULL, "o CancelResponse;o Services;o Service;a0 Name;c;c;o Subscriptions;o Subscription;a1 ID;o BalanceImpacts;o BalanceImpact;a2

ImpactType;e3 Amount;c;c;c;c;e4 Currency;e5 Amount;f;", rgxps, msoffixSOAP);

printf("<Service> Name attribute=%s\n", wzServiceName);

printf("<Subscription> ID attribute=%s\n", wzSubscriptionID);

printf("<BalanceImpact> ImpactType attribute=%s\n", wzBalanceImpactImpactType);

printf("<Amount> element text=%s\n", wzBalanceImpactAmount);

printf("Final <Currency> element text=%s\n", wzCurrency);

printf("Final <Amount> element text=%s\n", wzTotalAmount);

Thus, the import API 30 advantageously allows a user to selectively import content from a hierarchical structured document with a single line of code and a hierarchical structured document containing lists with a single line of code and a callback statement. As discussed briefly above, the API 30 may import content as a data stream, a memory buffer, or a file.

Figure 5:
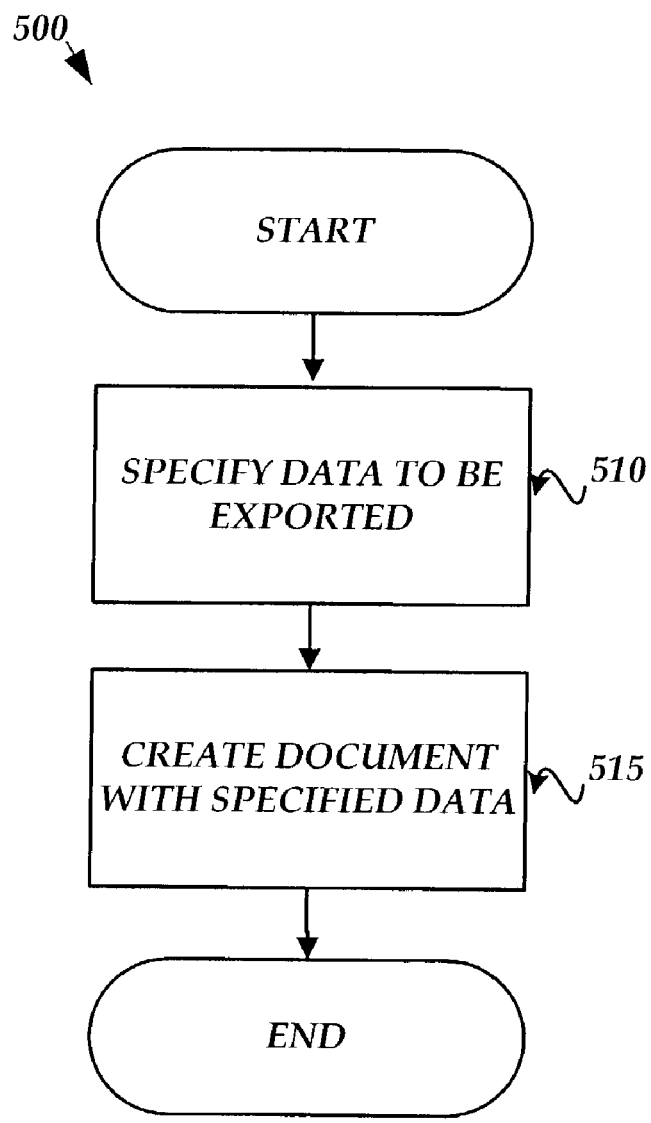
FIG. 5 is a flow chart showing steps performed by an illustrative routine of exporting data to create an electronic document according to an embodiment of the present invention.

FIG. 5 is a flow chart showing an illustrative routine 500 for selectively exporting content to create an electronic document, such as an XML file, in a computer system according to an embodiment of the invention. For purposes of description, FIG. 5 is described with reference to FIGS. 1 and 3.

The routine 500 begins at block 510 where the export API 40 specifies data to be exported. As described briefly above, the data may include text strings or a fixed list of variables. A user may specify specific data to be exported in the application program 100 (which may be a word processor) which in turn communicates this information to the export API 40. In specifying the data to be exported a user would also specify how the data is to be represented in the created document. For example, a user might specify that the text string "Services" be represented as an element and "Name" as an attribute of the "Service" element. The export API 40 sends the specified data to the writer 80 which creates a document using the specified data at block 520.

The routine illustrated in FIG. 5 may be implemented as a function call to create the illustrative XML file listed above using the illustrative code samples shown below.

Illustrative Use of Export API:

MsoFExportXML(pistm, "n o;o CancelResponse;o Services;e Service ;a Name "Some service";c;o Subscriptions;o Subscription;a ID "Subscription ID";o BalanceImpacts;o BalanceImpact;a ImpactType "Type of impact";e Amount "Non-zero amount of impact";c;c;c;c;e Currency "Account Currency type";e Amount "Total balance impact";c;", msogrffexSOAP)

In the illustrative uses of the export API shown above, the client 20 passes in an action string formatted in a similar fashion as the action strings in the illustrative uses of the import API 30. Here, an action string is a sequence of individual actions indicating content to write to the XML document. In the example above, the "e Amount 'Total balance impact'" action means to write the XML element <Amount> containing the text "Total balance impact", the "c" action means to write a close element matching the current scope, and so on. The illustrative line of code above may be used to generate an entire XML document without lists. The generated document corresponds to and can be imported by the non-list import code sample (i.e., without the callback function) shown above in the description of FIG. 4.

MSOHEXS hexs;

MsoFInitExportXML(pistm, &hexs);

MsoFExportXMLContents(&hexs, "n o;o CancelResponse;o Services;");

while (FSomeItemsLeftInMyList(wzServiceName)) // Fill out wzServiceName with current service string.

MsoFExportXMLContents2(&hexs, "e Service ;a Name %0;", &wzServiceName); //

Write: <Service Name="Some service">

MsoFExportXMLContents(&hexs, "c;");

// And so on for the rest of the tags . . .

MsoFFinishExportXML(&hexs);

The illustrative lines of code above may be used to create an XML file with lists. The created file corresponds to and can be imported by the list import code example (i.e., with the callback function) shown above in the description of FIG. 4. Thus, the export API 40 advantageously allows a user to selectively export content, including multiple elements and attributes at once, to create hierarchical structured documents with a single line of code and hierarchical structured documents containing lists with just a few lines of code.

As described above, an application program interface (API) may be implemented to import content from a hierarchically structured document, such an XML file. The API works in conjunction with a parser to scan the document and extract content from selected elements, nodes, attributes, and text. The API also utilizes a callback component for processing the extracted content (e.g., from lists). The import API allows the specification of specific data to be extracted from a document. This is advantageous over using event-based parsers, which sequentially provide one item of data at a time from a document, and tree-based parsers, which required the navigation of a loaded file to find desired data, directly.

An API may also be implemented to export data to create a hierarchically structured document, such as an XML file. The API works in conjunction with a writer to receive data and export the data as elements, nodes, attributes, and text in a hierarchically structured document. The export API allows writing multiple pieces of data (such as XML content) or an entire file in a single API call. This is more advantageous than using a writer (such as an XML writer) which only allows writing one piece of data at a time. It will be appreciated that the import API 30 and the export API 40 may be implemented in managed or unmanaged code. Other embodiments of the invention will be apparent to those skilled in the art from consideration of the specification and practice of the invention disclosed herein.

I claim:

1. A method of exporting and selectively importing content to and from an electronic document, comprising:
    receiving from a data source content comprising data;
    specifying via an export application program interface (API) the data to be exported to create an electronic document;
    exporting the data via a writer in communication with the export API to create the electronic document;
    receiving the electronic document having the data and items of the content associated with the data, wherein the data defines a hierarchical file structure;
    specifying via an import API at least one piece of the data within the electronic document to be imported from the electronic document, wherein the at least one piece of the data is associated with at least one item of the content in the electronic document;
    selectively parsing the electronic document for the at least one piece of the data via a parser in communication with the import API;
    extracting a first item from the content associated with the at least one piece of the data from the electronic document therein allowing specification of specific data to import from the electronic document for display via a display device;
    after extracting the first item of the content associated with the at least one piece of the data from the electronic document, determining via a callback component in communication with the import API when there are any additional items of the content associated with the at least one piece of the data;
    when there are additional items of the content associated with the at least one piece of the data, extracting a next item of the content associated with the at least one piece of the data from the electronic document; and
    displaying each item of the content extracted via the display device for viewing by a user.

2. The method of claim 1, wherein the hierarchical file structure is XML.

3. The method of claim 1, wherein the at least one piece of the data is an XML element.

4. The method of claim 1, wherein the at least one piece of the data is an XML attribute.

5. The method of claim 1, wherein the at least one piece of the data is an XML node.

6. The method of claim 1, wherein the at least one piece of the data is text.

7. The method of claim 1, wherein extracting a first item from the content comprises importing the first item from a data stream.

8. The method of claim 1, wherein extracting a first item from the content comprises importing the first item from a memory buffer.

9. The method of claim 1, wherein extracting a first item from the content comprises importing the first item from a file.

10. A computer-storage medium readable by a computer system and having computer-executable components for exporting and importing content to and from an electronic document in a computer system, comprising:

an export component for,
receiving at the export component data from a source computer; and
specifying the data to be exported to create an electronic document wherein the data includes text strings or a fixed list of variables;

a writer component for,
receiving at the writer component the data specified from the export component and exporting the data to create the electronic document wherein exporting the data comprises writing multiple pieces of the data in a single application program interface (API) call;

an import component for,
receiving the electronic document having data and items of content associated with the data, wherein the data defines a hierarchical file structure;
specifying to be imported from the electronic document at least one piece of the data, within the electronic document, associated with at least one item of the content in the electronic document;
extracting a first item of the content associated with the at least one piece of the data from the electronic document;
after extracting the first item of the content, determining whether there are any additional items of the content associated with the at least one piece of the data;
when there are additional items of the content, allowing a user to change how the additional items are processed; and
communicating with a parser component; and the parser component for,
selectively parsing the electronic document for the at least one piece of the data; and
sending the at least one piece of the data to the import component for display via a display device.

11. The computer-storage medium of claim 10, wherein the parser component is event-based.

12. The computer-storage medium of claim 10, having further computer-executable components comprising a callback component for processing the extracted items of content associated with the at least one piece of the data from the electronic document.

13. The computer-storage medium of claim 10, wherein the at least one item of content comprises a text string.

14. The computer-storage medium of claim 10, wherein the hierarchical file structure is XML.

15. The computer-storage medium of claim 10, wherein the at least one piece of the data is an XML element.

16. The computer-storage medium of claim 10, wherein the at least one piece of the data is an XML attribute.

17. The computer-storage medium of claim 10, wherein the at least one piece of the data is an XML node.

18. The computer-storage medium of claim 10, wherein the at least one piece of the data is text.

19. The computer-storage medium of claim 10, wherein the source is a client in the computer system.

20. The computer-storage medium of claim 10, wherein the source computer is a server in the computer system.

21. The method of claim 1, further comprising using the callback component to communicate back to an API during an import process, to change how the additional items are processed therein allowing content from a hierarchical structured document to be imported with a single line of code via a callback statement.

22. The method of claim 1 wherein specifying via an export API the data to be exported to create an electronic document further comprises specifying how the data is to be represented in the electronic document created.

* * * * *